US012656869B2

(12) United States Patent
Yoshitomi et al.

(10) Patent No.: US 12,656,869 B2
(45) Date of Patent: Jun. 16, 2026

(54) INFORMATION PROCESSING APPARATUS, INFORMATION PROCESSING SYSTEM, INPUT DEVICE, AND CONTROL METHOD

(71) Applicant: Lenovo (Singapore) Pte. Ltd., Singapore (SG)

(72) Inventors: Keiichi Yoshitomi, Kanagawa (JP); Mitsuhiro Yamazaki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 114 days.

(21) Appl. No.: 18/607,888

(22) Filed: Mar. 18, 2024

(65) Prior Publication Data

US 2024/0319793 A1 Sep. 26, 2024

(30) Foreign Application Priority Data

Mar. 23, 2023 (JP) ................................. 2023-046472

(51) Int. Cl.
*H04B 3/36* (2006.01)
*G06F 3/01* (2006.01)
*G06F 3/0354* (2013.01)

(52) U.S. Cl.
CPC .......... *G06F 3/016* (2013.01); *G06F 3/03545* (2013.01)

(58) Field of Classification Search
CPC .. G06F 3/016; G06F 3/03545; G06F 3/04162; G06F 3/167; G06F 3/0386; G06F 3/0383
See application file for complete search history.

(56) References Cited

U.S. PATENT DOCUMENTS

| | | | | |
|---|---|---|---|---|
| 10,372,211 | B2 * | 8/2019 | Lee | ......................... G06F 3/016 |
| 11,500,467 | B1 * | 11/2022 | Ron | ...................... G06F 3/0383 |
| 11,550,421 | B2 * | 1/2023 | Sun | ........................ G06F 3/0383 |
| 2017/0364167 | A1 * | 12/2017 | Ribeiro | ................ G06F 3/0442 |

FOREIGN PATENT DOCUMENTS

| | | |
|---|---|---|
| JP | H07-141094 A | 6/1995 |
| JP | 2016-528654 A | 9/2016 |
| JP | 2019-61711 A | 4/2019 |
| JP | 2021-192213 A | 12/2021 |
| JP | 2022-67616 A | 5/2022 |
| WO | 2015/027024 A1 | 2/2015 |

* cited by examiner

*Primary Examiner* — Toan N Pham

(74) *Attorney, Agent, or Firm* — Osha Bergman Watanabe & Burton LLP

(57) ABSTRACT

An input-information acquisition unit acquires input information indicating pressure acting on an input device and a moving state of the input device, a vibration control unit controls vibration characteristics of a vibration source signal acquired from a vibration source based on the input information, and controls the vibration characteristics using a delayed speed that is obtained by delaying a speed indicating the moving state, the input device includes a vibration generator that vibrates in accordance with a drive signal, and the drive signal includes the vibration signal that has vibration characteristics controlled by the vibration control unit.

6 Claims, 8 Drawing Sheets

INFORMATION PROCESSING APPARATUS, INFORMATION PROCESSING SYSTEM, INPUT DEVICE, AND CONTROL METHOD

CROSS-REFERENCE TO RELATED APPLICATIONS

This application claims priority to Japanese Patent Application No. 2023-046472 filed on Mar. 23, 2023, the contents of which are hereby incorporated herein by reference in their entirety.

BACKGROUND

Technical Field

The present application relates to an information processing apparatus, an information processing system, an input device, and a control method.

Description of Related Art

A haptic pen is a digital pen with a haptics feedback function. A digital pen is an input device used for displaying and recording handwritten characters, drawings, and other contents on various information apparatuses. A digital pen is also called an electronic pen, smart pen, stylus, etc. Haptics feedback is realized by vibrating a vibrating body in response to a contact with a touch panel that displays characters or the like.

For instance, Japanese Unexamined Patent Application Publication No. 2021-192213 describes a handwriting data generator that generates haptics feedback in accordance with the stroke-data reproduction. This generator is configured to associate the haptic feedback with at least a portion of stroke data generated in response to handwriting input, and to generate digital ink that includes the stroke data and the haptics data indicative of haptics feedback.

For a haptic pen, the amount of vibration may be controlled based on writing pressure or writing speed. This is to express the feeling of friction with a contact object during a writing operation. The feeling of friction can be expressed even when the coefficient of friction is low, such as with a panel or pen tip having a smooth surface. The conventional apparatuses, however, do not take the weight of the pen into account. For instance, the lightness of a wooden pencil or the heaviness of a high-end fountain pen cannot be expressed by the amount of vibration alone.

SUMMARY

To solve the above-stated problems, an information processing system according to the first aspect of the present invention includes: an input-information acquisition unit that acquires input information indicating pressure acting on an input device and a moving state of the input device; and a vibration control unit that controls vibration characteristics of a vibration source signal acquired from a vibration source based on the input information. The vibration control unit controls the vibration characteristics using a delayed speed that is obtained by delaying a speed indicating the moving state. The input device includes a vibration generator that vibrates in accordance with a drive signal. The drive signal includes the vibration signal that has vibration characteristics controlled by the vibration control unit.

The information processing system may further include a mixer that synthesizes a vibration signal, which is obtained by controlling the vibration characteristics of the vibration source signal, and a sound signal thus generating a drive signal.

The information processing system may further include a sound control unit that controls acoustic characteristics of a sound source signal obtained from a sound source without delaying the speed, based on the input information. The mixer may synthesize the vibration signal and a sound signal, which is obtained by controlling the acoustic characteristics of the sound source signal, thus generating the drive signal.

In the information processing system, vibration characteristics of the vibration signal may include amplitude.

In the information processing system, the information processing apparatus may include a sound collection unit that collects surrounding sound, and the controller may determine the intensity of the sound component based on the intensity of the sound collected by the sound collection unit.

An information processing apparatus according to the second aspect of the present invention includes: an input-information acquisition unit that acquires input information indicating pressure acting on an input device and a moving state of the input device; a vibration control unit that controls vibration characteristics of a vibration source signal acquired from a vibration source based on the input information, thus generating a vibration signal; and a communication unit that outputs a drive signal including the vibration signal to the input device. The vibration control unit controls the vibration characteristics using a delayed speed that is obtained by delaying a speed indicating the moving state.

An input device according to the third aspect of the present invention includes: a controller that acquires input information indicating pressure acting on the input device and a moving state of the input device, and controls vibration characteristics of a vibration source signal acquired from a vibration source based on the input information, thus generating a vibration signal; and a vibration generator that generates vibrations based on a drive signal including the vibration signal.

A control method according to the fourth aspect of the present invention is for an information processing system including an information processing apparatus and an input device. The input device includes a vibration generator that vibrates based on a drive signal including a vibration signal. The information processing apparatus or the input device acquires input information indicating pressure acting on the input device and a moving state of the input device, controls vibration characteristics of a vibration source signal acquired from a vibration source based on the input information, thus generating a vibration signal, and controls the vibration characteristics using a delayed speed that is obtained by delaying a speed indicating the moving state.

The above-described aspects of present invention express the weight of the input device to enhance the usability of the input device.

DETAILED DESCRIPTION

First Embodiment

Figure 1:
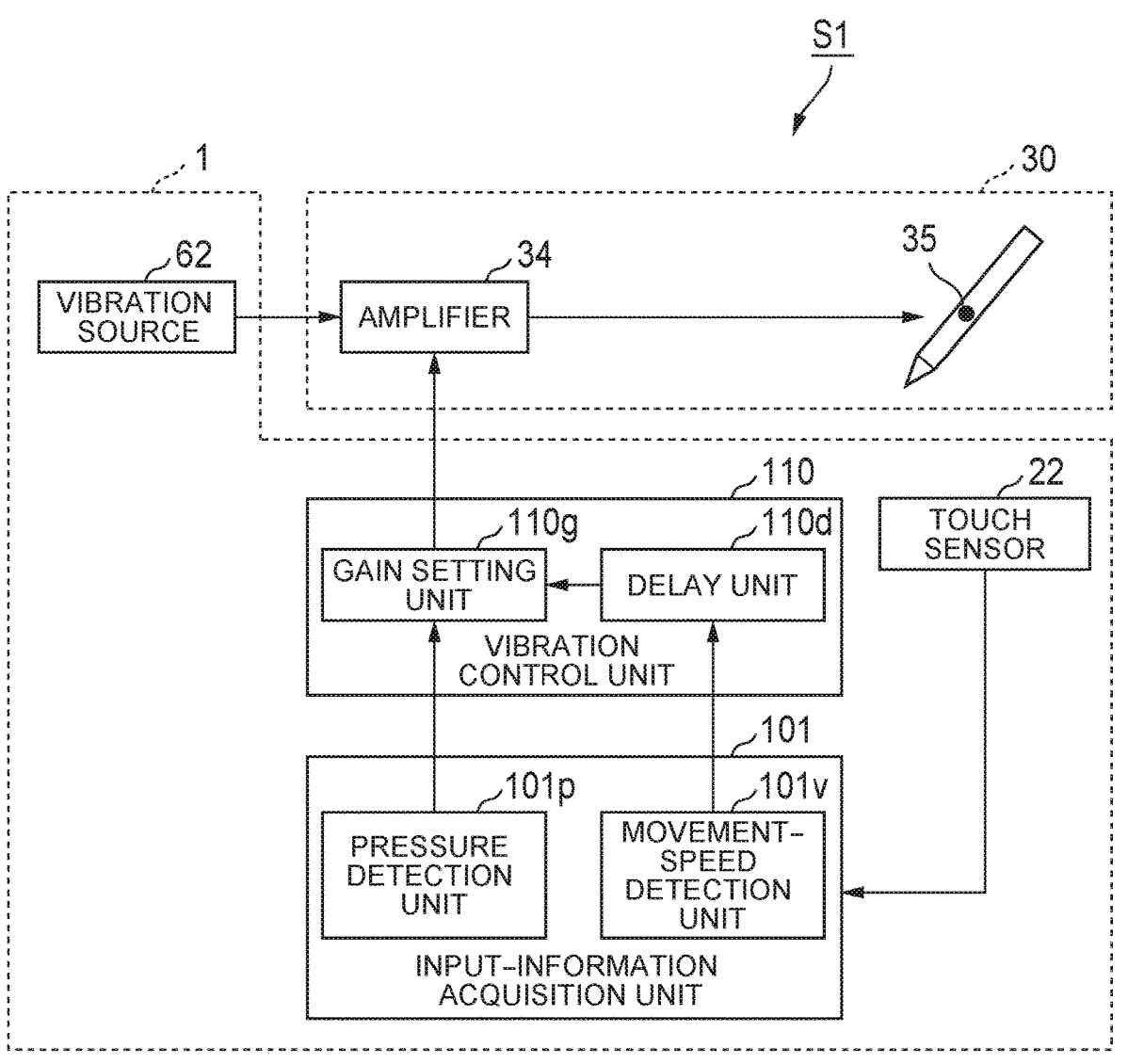
FIG. 1 is a block diagram schematically illustrating one example of the basic configuration of an information processing system according to a first embodiment.

The following describes one embodiment of the present application, with reference to the drawings. First, the following describes the overview of the information processing system S1 according to a first embodiment. FIG. 1 is a block diagram schematically illustrating one example of the basic configuration of the information processing system S1 according to the present embodiment. The information processing system S1 includes an information processing apparatus 1 and an input device 30. The input device 30 is a digital pen with a tactile presentation function. A digital pen is a pen-shaped operating medium and functions as a writing device. In this application, a digital pen may be referred to simply as a "pen".

The information processing apparatus 1 comes with a touch sensor 22. The touch sensor 22 includes a pressure sensor that detects pressure distribution caused by a contact with various objects. The detected pressure distribution indicates the pressure acting on the input device 30. The pressure sensor may be based on any method such as a capacitive touch method or a resistive touch method. The information processing apparatus 1 is connected to the input device 30 wirelessly so as to be able to output various data.

The information processing apparatus 1 includes an input-information acquisition unit 101, a vibration control unit 110, and a vibration source 62.

The input-information acquisition unit 101 acquires input information indicating the usage status of the input device 30 based on detection information input from the touch sensor 22. The input-information acquisition unit 101 includes a pressure detection unit 101p and a movement-speed detection unit 101v.

The pressure detection unit 101p acquires (sampling) detection information input from the input device 30 at predetermined intervals, and detects, as a pressure, a representative value (e.g., the maximum value) of the pressure at each of the positions making up the pressure distribution indicated by the detection information. The pressure detection unit 101p outputs the detected pressure to the vibration control unit 110.

The movement-speed detection unit 101v acquires detection information input from the input device 30 at predetermined intervals, and specifies, as a contact position with the device, a representative point (e.g., representative values of gravity and pressure) of contact positions with the input device 30 from the pressure distribution indicated in the detection information. The movement-speed detection unit

101v calculates the movement speed based on the displacement from the contact position for the sample (hereinafter this may be referred to as the "previous sample") immediately before the latest sample (hereinafter this may be referred to as the "current sample") to the contact position for the current sample, and their sampling intervals. The movement-speed detection unit 101v outputs the calculated movement speed to the vibration control unit 110.

The vibration control unit 110 controls the vibration characteristics of the vibration source signal output from vibration source 62 based on input information input from the input-information acquisition unit 101. The vibration control unit 110 includes a delay unit 110d and a gain setting unit 110g.

The delay unit 110d delays the movement speed input from the movement-speed detection unit 101v by a predetermined delay amount. The amount of delay is typically about 20 to 50 ms. The delay unit 110d outputs the delayed movement speed to the gain setting unit 110g.

The gain setting unit 110g receives the pressure from the pressure detection unit 101p and the movement speed from the delay unit 110d. The gain setting unit 110g uses gain setting information to determine the gain for the vibration source signal based on the input pressure and movement speed. The gain setting unit 110g has the gain setting information that is set beforehand and indicates the relationship between the pressure or movement speed and the gain. The gain setting information may have any format of an information table or a calculation procedure. For instance, the gain setting information gives a relationship between higher pressure or higher movement speed and greater gain. The gain setting unit 110g outputs the determined gain to the amplifier 34.

The vibration source 62 generates a vibration signal indicating a time series of amplitudes for each sample, and outputs the generated vibration signal to the amplifier 34.

The input device 30 includes the amplifier 34 and a vibration generator 35.

The amplifier 34 amplifies the amplitude of the vibration signal input from the vibration source 62. The amplifier 34 amplifies the amplitude according to the gain input from the gain setting unit 110g. The amplifier 34v supplies, as a drive signal, a vibration signal to the vibration generator 35. The vibration signal is obtained by amplifying the amplitude.

The vibration generator 35 generates vibrations according to the drive signal supplied from the amplifier 34. The vibration generator 35 includes an actuator.

Figure 4:
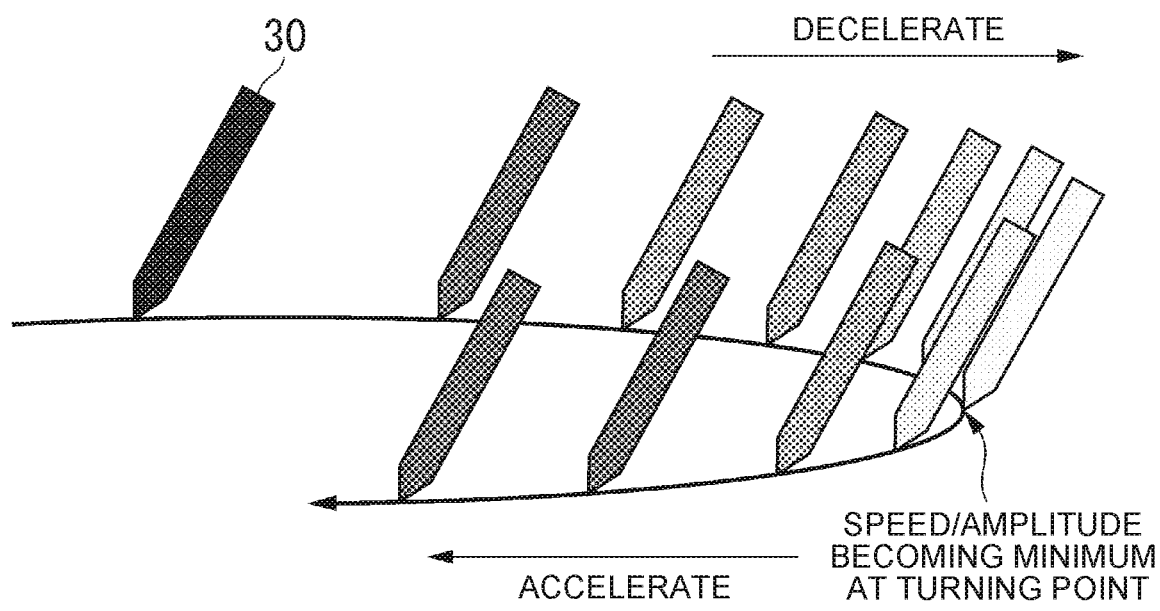
FIG. 4 explains an example of amplitude changes in an input device in a comparative example.

This embodiment assumes the case where, as illustrated in FIG. 4, the input device 30 is operated for writing or drawing (this may be referred to collectively as "writing" in this application). In operations related to writing, the position of the input device 30 is repeatedly turned around within a fixed space. At or near the turning point, the movement speed tends to be lower than the surrounding area. In the example of FIG. 4, the input device 30 initially moves from left to right, and then turns around to move from right to left. The speed of the input device 30 decelerates as it approaches the turning point, and accelerates after passing the turning point. In the drawing, the shading of the input device 30 indicates the moving speed. The darker the shading, the higher the movement speed. In the comparative example, the amplitude of the vibration signal is determined so that it simply increases as the moving speed increases. In this case, the intensity of vibrations generated in the input device 30 becomes minimum at the turning point.

Figure 5:
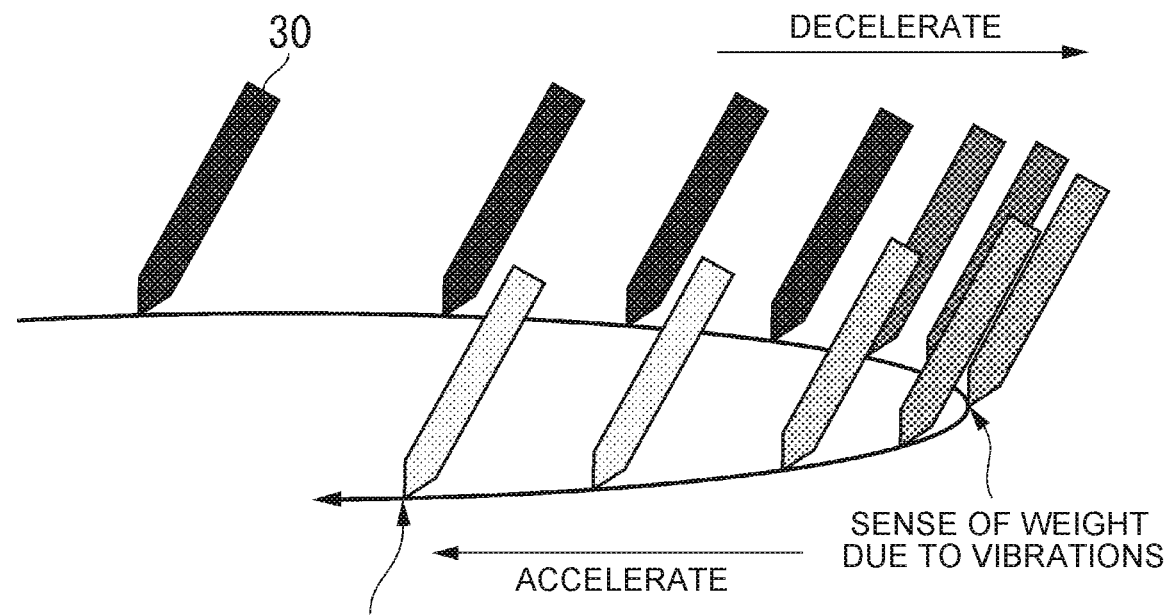
FIG. 5 explains an example of amplitude changes in an input device in the first embodiment.

In contrast, the amplitude of the vibration signal in this embodiment is determined according to the movement speed that is delayed from the movement of the input device 30. As illustrated in FIG. 5, when the input device 30 passes through the turning point, strong vibrations occur according to a higher moving speed than the actual moving speed. The user operating the input device 30 experiences an illusion of weight due to strong vibrations that should not occur. After the input device 30 passes the turning point, the input device 30 accelerates, whereas the amplitude decreases with deceleration. When the movement speed is high, the user tends to pay attention to the movement of the input device 30, making it difficult to notice a decrease in the amplitude intensity. Thus, the user senses the weight of the input device 30 during the entire operation of the input device 30.

Figure 2:
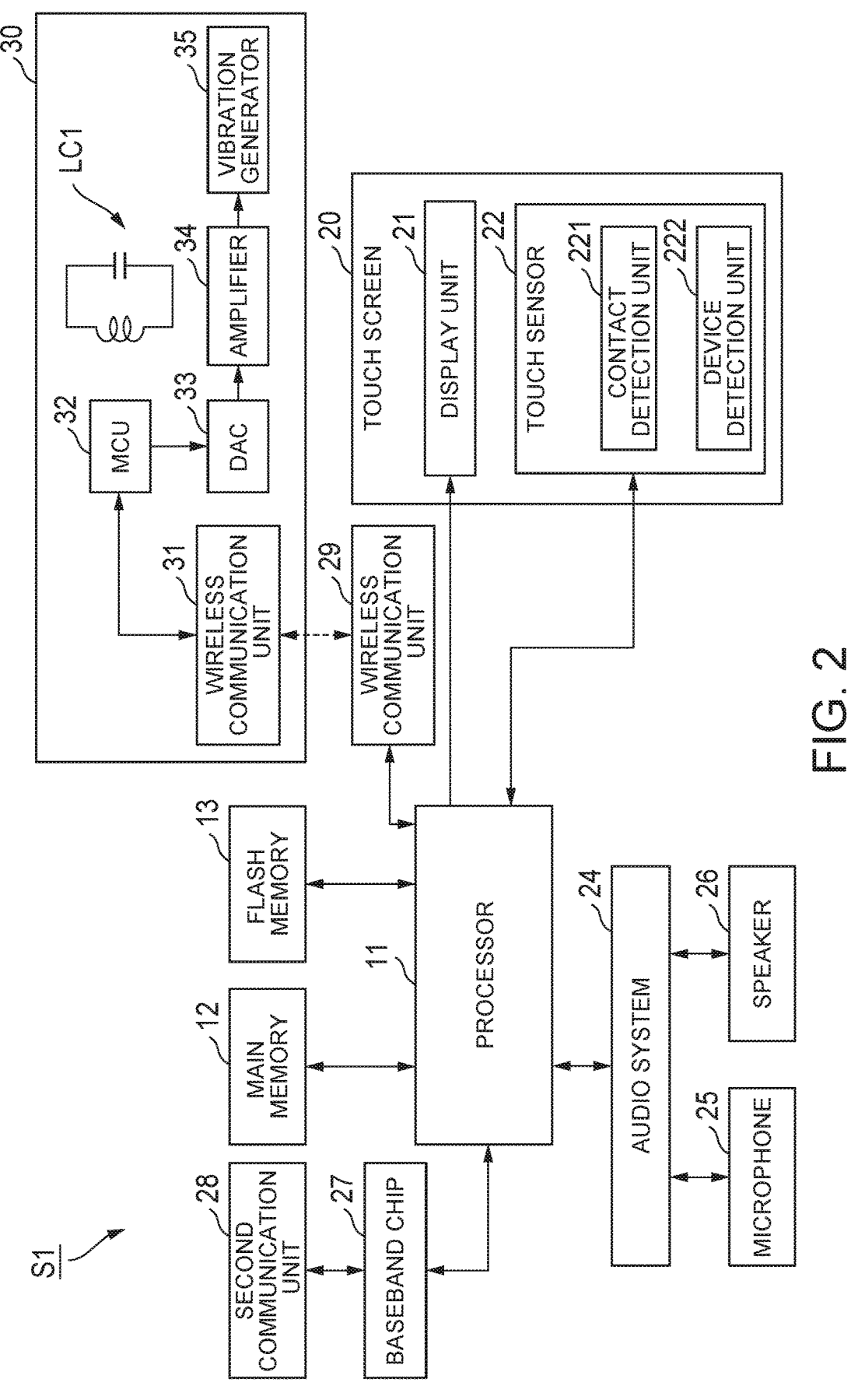
FIG. 2 is a block diagram illustrating one example of the hardware configuration of the information processing system according to the first embodiment.

Next, the following describes an example of the hardware configuration of the information processing system S1 according to the present embodiment. FIG. 2 is a block diagram illustrating one example of the hardware configuration of the information processing system S1 according to the present embodiment. The information processing system S1 includes the information processing apparatus 1 and an input device 30. The illustrated information processing apparatus 1 is embodied as an information terminal apparatus equipped with a computer system. The information processing apparatus 1 may be embodied as a general-purpose information apparatus such as a personal computer, a mobile phone, or a tablet terminal, or may be embodied as a dedicated information apparatus such as a handheld terminal or a kiosk terminal. The information processing apparatus 1 includes a processor 11, a main memory 12, a flash memory 13, a touch screen 20, an audio system 24, a microphone 25, a speaker 26, a baseband chip 27, a second communication unit 28, and a wireless communication unit 29.

Figure 3:
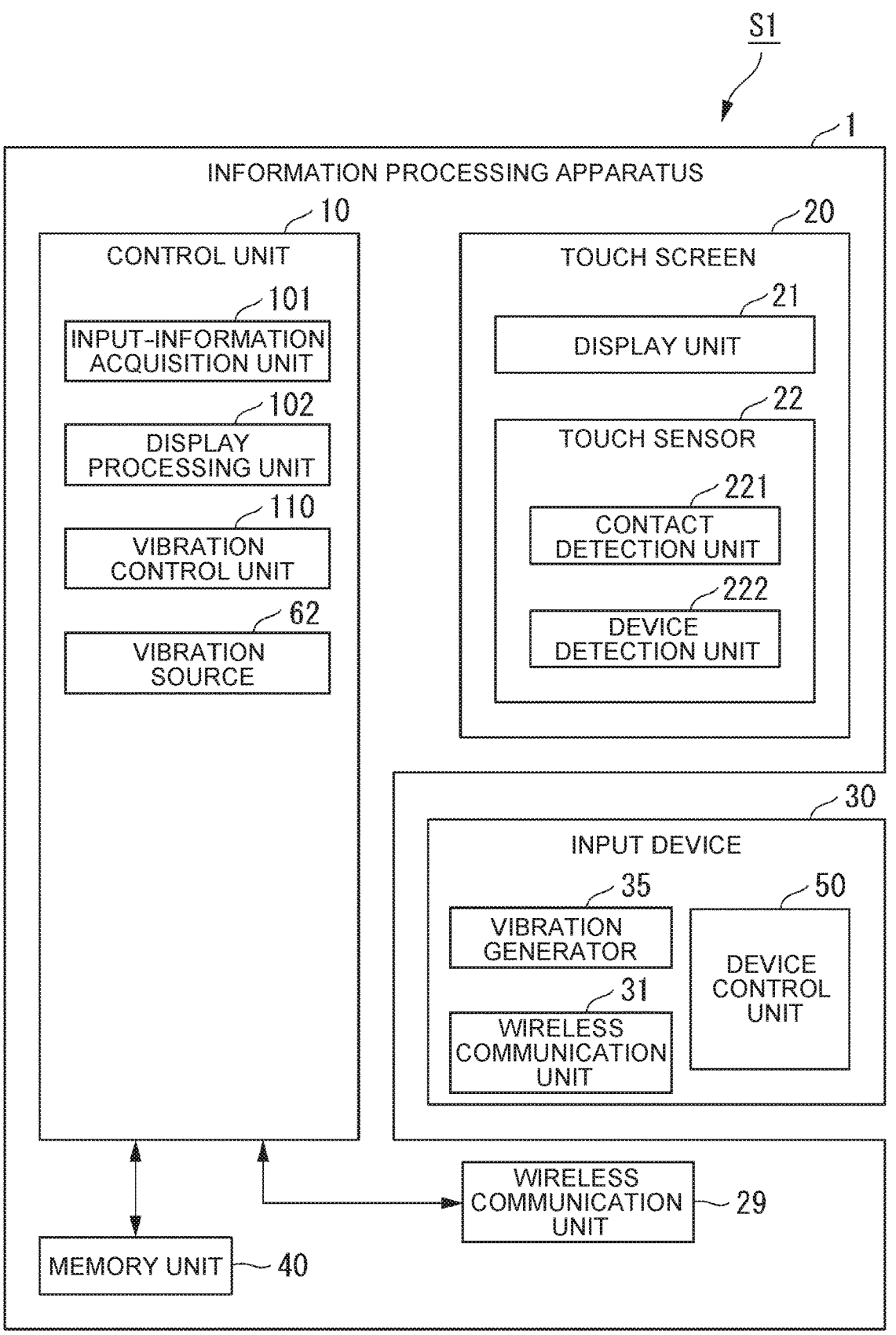
FIG. 3 is a block diagram illustrating one example of the functional configuration of the information processing system according to the first embodiment.

The processor 11 controls the functions of the entire information processing apparatus 1. For instance, the processor 11 includes one or more central processing units (CPUS). The processor 11 executes a predetermined program, and cooperates with the main memory 12 and other hardware to constitute a computer system that functions as the control unit (controller) 10 (FIG. 3). As described below, the control unit 10 includes the input-information acquisition unit 101 and the vibration control unit 110 (FIGS. 1 and 3).

The main memory 12 is a writable memory used as a work area of the processor 11, that is, an area for reading execution programs and various configuration data, and an area for writing processing data acquired through the program execution. For instance, the main memory 12 includes a plurality of dynamic random access memory (DRAM) chips. Executable programs include operating systems (OS), various device drivers for controlling peripherals, various services/utilities, and application programs (they may be to as "applications" in this application).

The flash memory 13 stores various programs and various data in advance.

The display unit 21 displays various screen images based on the display data output from the processor 11. For instance, the display unit 21 may be any display device, such as a liquid crystal display or an organic electro-luminescence display.

The touch sensor 22 includes a contact detection unit 221 and a device detection unit 222.

The contact detection unit 221 detects an object (mainly the input device 30 in this application) that has come in contact with the display screen and its position of the contact. The contact detection unit 221 detects a contact pressure of an object that has come in contact with the display screen. For instance, the contact detection unit 221 includes a capacitive pressure sensor. The contact detection unit 221 may detect the tilt of the object in contact, that is, the pen angle. If the contact detection unit 221 includes a three-axis pressure sensor, the pen angle can be specified using the direction cosine of the pressure in each axial direction.

The device detection unit 222 may detect, as an approach position, the input device 30 that has approached the device detection unit 222 and its position, although the input device 30 has not come in contact with it. For instance, the device detection unit 222 includes an electromagnetic induction sensor. The electromagnetic induction sensor detects an alternating-current induced magnetic field generated in a resonant circuit LC1 (described later) of the input device 30 when approached. The electromagnetic induction sensor detects the presence or not of a position where the magnitude of the detected magnetic field at its resonant frequency exceeds a certain value, thereby detecting whether the input device 30 has approached. The electromagnetic induction sensor specifies the position where the magnitude of the detected magnetic field exceeds a certain value as the approaching position of the input device 30.

The audio system 24 enables processing of sound signals. The processing of sound signals includes input, output, recording, playback, encoding, and decoding. For instance, the audio system 24 includes an audio integrated circuit (IC). The audio system 24 is connected to a microphone 25 and a speaker 26. The audio system 24 can receive a sound signal from the processor 11, the microphone 25, or the baseband chip 27. The audio system 24 reads out the sound signal recorded therein. The audio system 24 can output the acquired sound signal to the speaker 26 or the processor 11. The sound signal output to the processor 11 can be output to the input device 30 via the wireless communication unit 29.

The microphone 25 collects sound arriving there and generates a sound signal representing the sound collected. The microphone 25 outputs the generated sound signal to the audio system 24. The speaker 26 presents sound based on the sound signal input from the audio system 24.

The baseband chip 27 is a dedicated IC for controlling a communication using the second communication unit 28. The baseband chip 27 implements communications using, for example, public wireless communication systems such as 4G (fourth generation wireless communication system) and 5G (fifth generation wireless communication system), and premises wireless communication networks as specified in IEEE 802.11. Under the control of the processor 11, the baseband chip 27 is connected to other devices via the communication network using the second communication unit 28 so as to be able to transmit and receive various data, and thus transmits and receives various data.

The second communication unit 28 is a wireless communication module for connecting to a wireless communication network. The second communication unit 28 includes an antenna that transmits and receives radio waves.

The wireless communication unit 29 is a wireless communication module for wirelessly transmitting and receiving data to and from the input device 30. For instance, the wireless communication unit 29 uses a communication method that is the wireless personal area network (PAN) specified in IEEE 802.15.1.

The input device 30 is an operating medium having an elongated shape with a length greater than its diameter. The input device 30 includes a wireless communication unit 31, an MCU 32, a DAC 33, an amplifier 34, a vibration generator 35, and a resonant circuit LC1.

The wireless communication unit 31 is a wireless communication module for wirelessly transmitting and receiving data to and from the wireless communication unit 29 of the information processing apparatus 1.

The micro controller unit (MCU) 32 controls the functions of the input device 30 in an integrated manner. The MCU 32 includes a processor, memory such as ROM and RAM, and various input/output interfaces. The MCU 32 operates independently of the information processing apparatus 1.

The MCU 32 receives a vibration source signal and vibration control information from the information processing apparatus 1 using the wireless communication unit 31. The vibration control information contains information indicating the gain set by the vibration control unit 110. The MCU 32 sets the gain notified with the vibration control information to the amplifier 34. The MCU 32 outputs the vibration source signal input thereto to the DAC 33.

The digital-to-analog converter (DAC) 33 converts the digital vibration source signal input from the MCU 32 into an analog vibration source signal. The DAC 33 outputs the converted analog vibration source signal to the amplifier 34.

The amplifier 34 adjusts the amplitude of the vibration source signal input from the DAC 33, and outputs, as a drive signal, the vibration signal obtained by adjusting the amplitude to the vibration generator 35.

The vibration generator 35 is an actuator that generates vibrations according to the drive signal input from the amplifier 34. For instance, the vibration generator 35 includes a piezoelectric vibrator such as a piezo element.

The resonant circuit LC1 is an electric circuit that generates a current that resonates at a constant resonant frequency. For instance, the resonant circuit LC1 is configured by connecting a coil and a capacitor in series. The resonant circuit LC1 generates alternating current, thus generating a magnetic field of varying polarity at its resonant frequency. The device detection unit 222 of the touch sensor 22 detects an approach of the input device 30 due to the generated magnetic field. The resonant circuit LC1 is electrically isolated from the DAC 33, amplifier 34 and vibration generator 35.

Next, the following describes an example of the functional configuration of the information processing system S1 according to the present embodiment. FIG. 3 is a block diagram illustrating one example of the functional configuration of the information processing system S1 according to the present embodiment. The information processing system S1 includes the information processing apparatus 1 and the input device 30.

The information processing apparatus 1 includes the control unit 10, the touch sensor 22, and the wireless communication unit 29. The touch sensor 22 detects, as an input operation with the input device 30, a contact with the display screen or an approach within a certain distance (hovering) and also specifies its position. The touch sensor 22 generates detection information indicating the detected contact or approach and its position, and outputs the generated detection information to the control unit 10. When the touch sensor 22 comes in contact with the input device 30, it detects the pressure distribution due to the contact, and outputs the detected pressure-distribution information, which is included in the detection information, to the control unit 10.

The control unit 10 controls the overall function of the information processing apparatus 1. The control unit 10 includes a display processing unit 102, the input-information acquisition unit 101, the vibration control unit 110, and the vibration source 62.

As described above, the input-information acquisition unit 101 acquires input information indicating the usage status of the input device 30 based on detection information input from the touch sensor 22. The input-information acquisition unit 101 has functions of the pressure detection unit 101$p$ and the movement-speed detection unit 101$v$. As for the functions of the pressure detection unit 101$p$ and movement-speed detection unit 101$v$, their explanation in FIG. 1 will be applied unless otherwise noted. The movement-speed detection unit 101$v$ notifies the display processing unit 102 of the contact position that is acquired every sampling period based on the detection information input from the touch sensor 22.

The display processing unit 102 generates a movement locus based on a time series of contact positions that includes contact positions at the sampling periods that are input from the input-information acquisition unit 101. The display processing unit 102 outputs the display data indicating the generated movement locus to the display unit 21 of the touch screen 20. Note that the function of the input-information acquisition unit 101 is implemented by executing a device driver for the touch sensor 22, for example.

As described above, the vibration control unit 110 controls the amplitude of the vibration source signal output from vibration source 62 based on input information input from input-information acquisition unit 101. The vibration control unit 110 has functions of the delay unit 110$d$ and the gain setting unit 110$g$. As for the functions of the delay unit 110$d$ and gain setting unit 110$g$, their explanation in FIG. 1 will be applied unless otherwise noted. The gain setting unit 110$g$ determines the gain for the vibration signal based on the pressure and delayed movement speed. The gain setting unit 110$g$ wirelessly outputs vibration control information indicating the determined gain to the input device 30 using the wireless communication unit 29.

The vibration source 62 generates a vibration source signal indicating a time series of amplitudes at sampling times, and outputs the generated vibration source signal to the input device 30 using the wireless communication unit 29.

The wireless communication unit 29 transmits and receives various data wirelessly with the input device 30 using a predetermined communication method.

Next, the following describes an example of the functional configuration of the input device 30. The input device 30 includes the wireless communication unit 31, the vibration generator 35, and a device control unit 50.

The wireless communication unit 31 transmits and receives various data wirelessly with the information processing apparatus 1 using a predetermined communication method.

The device control unit 50 controls the functions of the input device 30. The device control unit 50 receives a vibration source signal and vibration control information from the information processing apparatus 1 using the wireless communication unit 31, for example. The device control unit 50 adjusts the amplitude of the vibration source signal based on the gain indicated by the vibration control information and outputs, as a drive signal, the vibration signal with the adjusted amplitude to the vibration generator 35. For instance, the functions of the device control unit 50 are implemented by the MCU 32 executing predetermined firmware and cooperating with the DAC 33, the amplifier 34, and other hardware.

The vibration generator 35 vibrates according to the drive signal supplied from the device control unit 50. The vibrations generated in the vibration generator 35 cause other parts of the input device 30 to vibrate.

Second Embodiment

Next, the following describes a second embodiment, mainly about differences from the first embodiment. Functions and configurations common to those of the first embodiment are designated with common reference numerals, and their explanation will be applied unless otherwise specified. The first embodiment exemplifies the case in which the vibration generator 35 vibrates according to a drive signal that contains a vibration component. The present embodiment exemplifies a case in which the vibration generator 35 vibrates according to a drive signal that includes a vibration component and also a sound component. The input device 30 based on the sound component vibrates, thus vibrating the surrounding air and generating sound.

In this application, the vibration component is primarily a low-frequency component about 400 Hz or lower, whereas the sound component is primarily a high-frequency component about 200 Hz or higher. In general, human auditory characteristics have sensitivity to the 500 Hz to 2 kHz band that is higher than sensitivity to other frequency bands, and are less sensitive to lower frequency bands. Human tactile characteristics have sensitivity to the 10 to 100 Hz band that is higher than sensitivity to other frequency bands, and vibrations are hardly perceived at frequencies of 500 Hz or higher.

Figure 6:
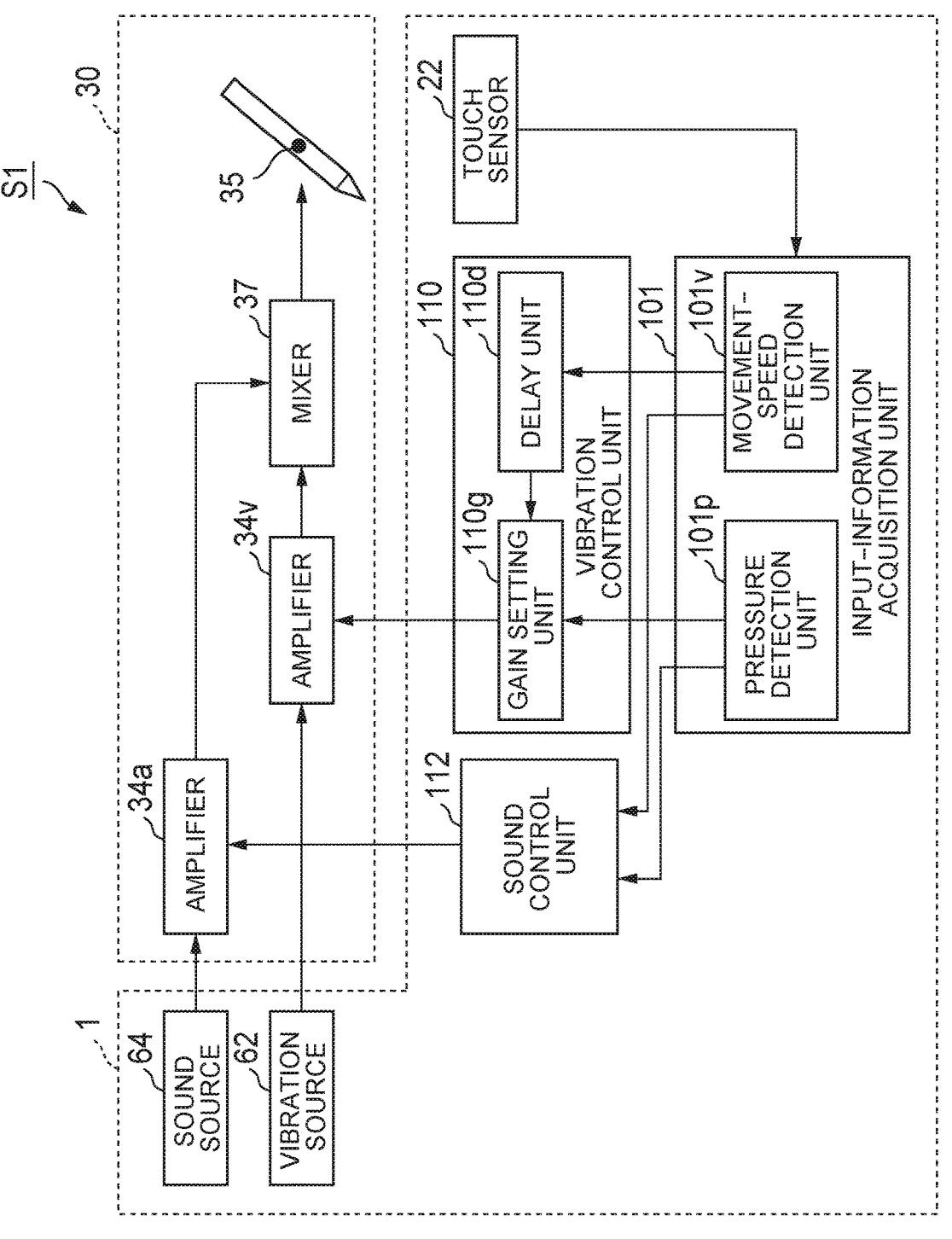
FIG. 6 is a block diagram schematically illustrating one example of the overall configuration of an information processing system according to a second embodiment.

Next, the following is an overview of the information processing system S1 according to the present embodiment. FIG. 6 is a block diagram schematically illustrating one example of the basic configuration of the information processing system S1 according to the present embodiment. The information processing apparatus 1 includes an input-information acquisition unit 101, a vibration control unit 110, and a vibration source 62, and also includes a sound control unit 112 and a sound source 64. The input device 30 includes an amplifier 34v and a vibration generator 35, and also includes an amplifier 34a and a mixer 37.

The sound control unit 112 controls the acoustic characteristics of a sound source signal based on input information input from input-information acquisition unit 101. The sound control unit 112 receives pressure from the pressure detection unit 101p and receives movement speed from the movement-speed detection unit 101v. The sound control unit 112 uses sound characteristic setting information to determine a gain that is an example of an acoustic characteristic for the sound source signal based on the input pressure and movement speed. The sound control unit 112 has acoustic-characteristic setting information that is set beforehand and indicates the relationship between the pressure or movement speed and the gain. The acoustic-characteristic setting information may have any format of an information table or a calculation procedure. For instance, the acoustic-characteristic setting information gives a relationship between higher pressure or higher movement speed and greater gain. The sound control unit 112 outputs the determined gain to the amplifier 34a. Unlike the vibration control unit 110, when determining the gain, the sound control unit 112 refers to the movement speed input from the movement-speed detection unit 101v without delaying it.

The sound source 64 generates a sound source signal indicating a time series of amplitudes of sound for each sample, and outputs the generated sound source signal to the amplifier 34a.

The amplifier 34a adjusts the amplitude of the sound source signal input from the sound source 64 based on the gain set by the sound control unit 112, and outputs the obtained sound signal to the mixer 37.

The functions of the amplifier 34v according to this embodiment correspond to the functions of the amplifier 34 according to the first embodiment. That is, the amplifier 34v adjusts the amplitude of the vibration source signal input from the vibration source 62 and outputs the resulting vibration signal to the mixer 37.

The mixer 37 adds (mixing) the sound signal input from the amplifier 34a and the vibration signal input from the amplifier 34v. The mixer 37 then supplies a drive signal, which is obtained by the addition, to the vibration generator 35.

Figure 7:
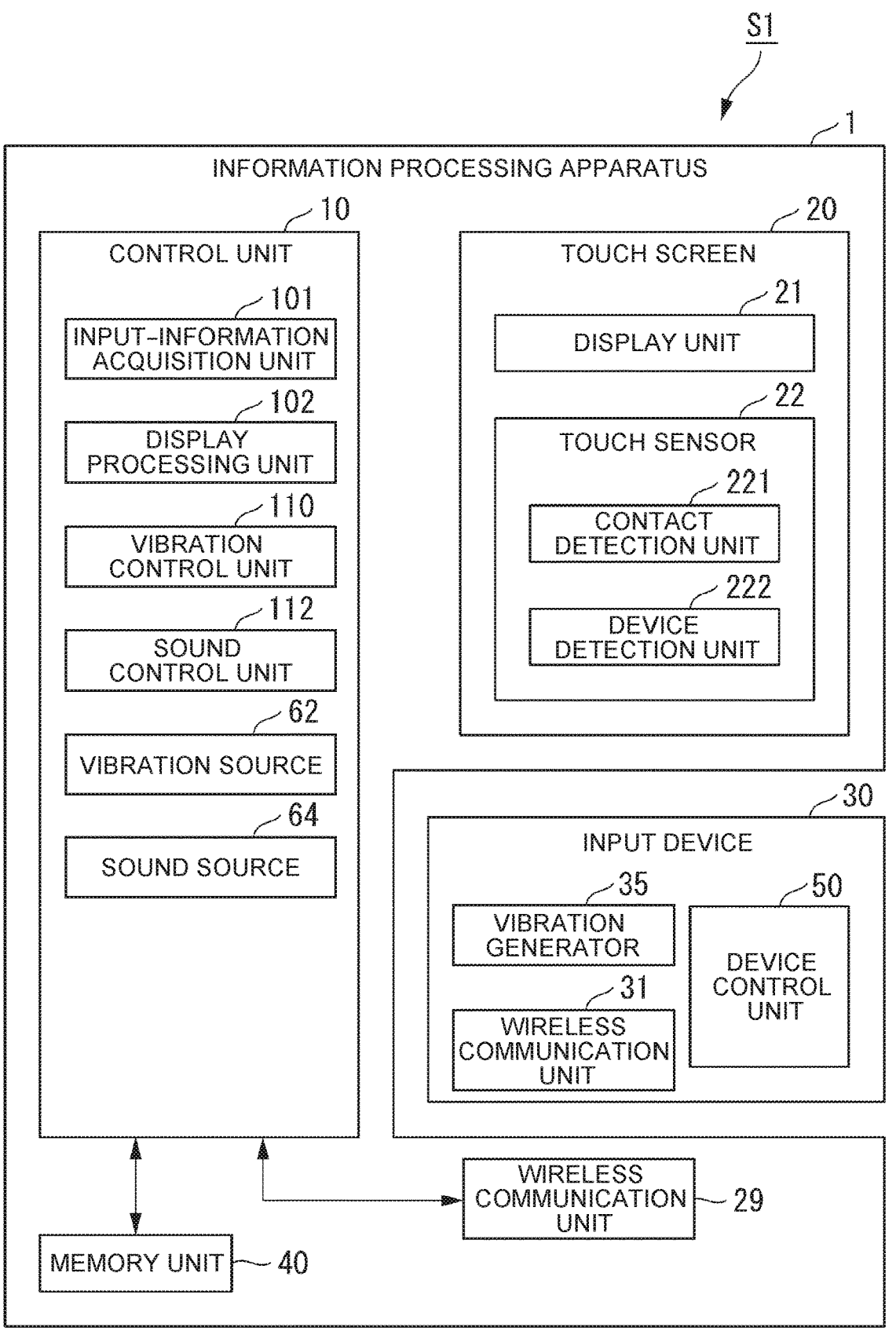
FIG. 7 is a block diagram illustrating one example of the functional configuration of the information processing system according to the second embodiment.

Next, the following describes an example of the functional configuration of the information processing system S1 according to the present embodiment. FIG. 7 is a block diagram illustrating one example of the functional configuration of the information processing system S1 according to the present embodiment. In the information processing system S1, the control unit 10 of the information processing apparatus 1 includes an input-information acquisition unit 101, a display processing unit 102, a vibration control unit 110, and a vibration source 62, and also includes a vibration control unit 110 and a sound source 64. The device control unit 50 of the input device 30 has the functions of the amplifiers 34v and 34a and mixer 37 (not illustrated).

The above configuration generates vibrations with an intensity corresponding to a movement speed that lags behind the actual movement speed of the input device 30. The input device 30 generates sound with a volume corresponding to the speed of movement, thus providing the user of the input device 30 with a sense of weight due to vibrations, without bringing about a sense of discomfort with the sound.

Modified Examples

Figure 8:
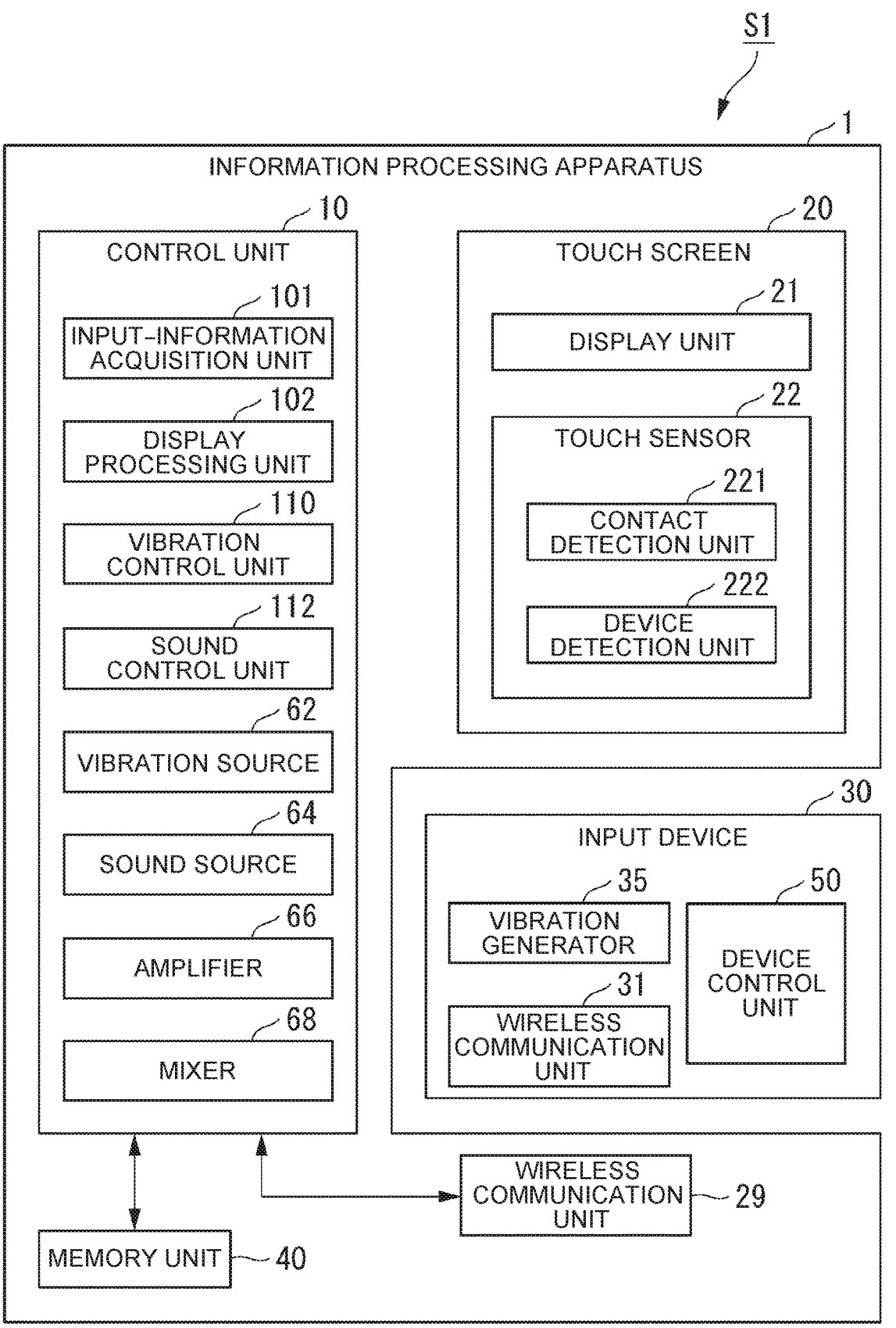
FIG. 8 is a block diagram illustrating one example of the functional configuration according to a first modified example.

The above embodiments may be modified. As illustrated in FIG. 8, the control unit 10 may include an amplifier 66 and a mixer 68. The amplifier 66 has similar functions to those of the amplifiers 34v and 34a.

That is, the amplifier 66 adjusts the amplitude of the vibration source signal input from the vibration source 62 in accordance with the gain set by the vibration control unit 110 and outputs the resulting vibration signal to the mixer 68. The amplifier 66 adjusts the amplitude of the sound source signal input from sound source 64 in accordance with the gain set by the sound control unit 112, and outputs the resulting sound signal to the mixer 68.

The mixer 68 adds the vibration signal and sound signal input from the amplifier 66 to generate a drive signal. The mixer 68 outputs the generated drive signal to the input device 30 using the wireless communication unit 29.

The device control unit 50 of the input device 30 supplies the drive signal input from the information processing apparatus 1 to the vibration generator 35 using the wireless communication unit 31. The vibration generator 35 generates vibrations according to the drive signal input from the device control unit 50.

In the input device 30, the functions of the amplifiers 34v, 34a and mixer 37 may be omitted. When no sound is presented from the input device 30, the sound source 64 and mixer 68 may be omitted in the information processing apparatus 1. In that case, the vibration signal with the amplitude adjusted by the amplifier 66 will be output to the input device 30.

Figure 9:
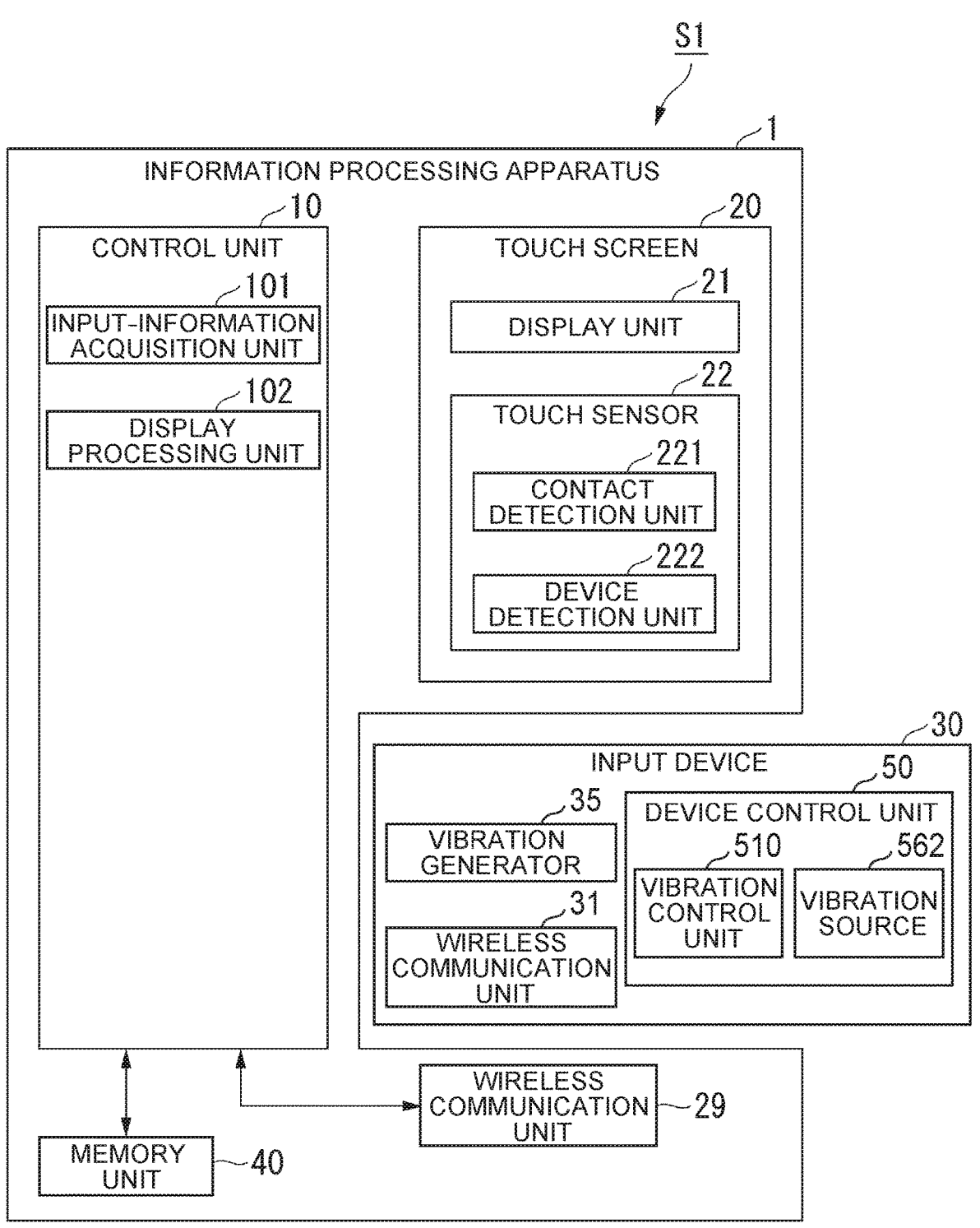
FIG. 9 is a block diagram illustrating one example of the functional configuration according to a second modified example.

The above describes mainly, but not limited to, the case where the information processing apparatus 1 has the functions of the vibration control unit 110 and the vibration source 62. The input device 30 may have the same functions as the vibration control unit 110 and vibration source 62, and the vibration control unit 110 and vibration source 62 may be omitted in the information processing apparatus 1. In the example in FIG. 9, the device control unit 50 of the input device 30 has a vibration control unit 510 and a vibration source 562. These vibration control unit 510 and vibration source 562 have the same functions as the vibration control unit 110 and vibration source 62, respectively.

The input-information acquisition unit 101 outputs the acquired input information to the input device 30 using the wireless communication unit 29.

The vibration control unit 510 of the input device 30 controls the vibration characteristics of the vibration source signal output from the vibration source 562 based on input information input from the information processing apparatus 1 using the wireless communication unit 31. The vibration control unit 510 supplies, as a drive signal, the vibration signal obtained by controlling the vibration characteristics to the vibration generator 35.

The device control unit 50 may further include a sound source, a sound control unit, and a mixer (not illustrated). The sound control unit controls the acoustic characteristics of the sound source signal output from the sound source based on input information input from information processing apparatus 1. The sound control unit outputs a sound signal obtained by controlling the acoustic characteristics to the mixer. The vibration control unit 510 outputs the vibration signal, which is obtained by controlling the vibration characteristics of a vibration source signal, to the mixer. The mixer adds the vibration signal input from the vibration control unit 510 and the sound signal input from the sound control unit to generate a drive signal. The mixer then outputs the generated drive signal to the vibration generator 35.

Note that, although the above description mainly describes the case where the acoustic characteristics of the sound source signal are controlled based on input information, the present invention is not limited to this. Acoustic characteristics are not controlled based on input information, and a driving signal may be obtained by adding the sound source signal as a sound signal to the vibration signal. This drive signal may be supplied to the vibration generator 35. The necessity of control based on input information may be set in advance depending on the type of sound source. When the type of sound source is an operational sound generated by writing, control may be performed based on input information. Such operational sound may be one that simulates the frictional sound, impact sound, or other sound caused by a contact between a physical writing instrument and a writing medium. The physical writing instrument may include a pen, pencil, brush, and chalk, and the writing medium may include paper, plastic sheet, and blackboard.

Control of acoustic characteristics based on input information may not be necessary for other types of sound sources, such as speech sounds, music, and sounds that are not based on writing.

As described above, the above-described information processing system S1 includes: the input-information acquisition unit 101 that acquires input information indicating the pressure acting on the input device 30 and the moving state of the input device; and the vibration control unit 110 that controls the vibration characteristics of the vibration source signal acquired from the vibration source 62 based on the input information. The vibration control unit 110 controls the vibration characteristics of the vibration source signal using the delayed speed that is obtained by delaying the speed indicating the moving state. The input device 30 includes the vibration generator 35 that vibrates in accordance with a drive signal. The drive signal includes the vibration signal that has vibration characteristics controlled by the vibration control unit 110.

With this configuration, the amplitude of the vibration signal is controlled according to the movement speed, which is delayed from the movement of the input device 30. When the movement speed decreases due to turning around the position of the input device 30 during the operation, vibrations with high intensity corresponding to the higher movement speed are generated. This allows the user operating the input device 30 to perceive a sense of weight due to the intense vibrations.

That is the detailed descriptions on the embodiments of the present invention, with reference to the drawings. The specific configuration of the present invention is not limited to the above-described embodiments, and also includes design or the like within the scope of the present invention. The configurations described in the above embodiments can be combined freely.

DESCRIPTION OF SYMBOLS

S1 information processing system
1 information processing apparatus
10 control unit
11 processor
12 main memory
13 flash memory
20 touch screen
21 display unit
22 touch sensor
24 audio system
25 microphone
26 speaker
27 baseband chip
28 second communication unit
29, 31 wireless communication unit
30 input device
32 MCU
33 DAC
34, 34a, 34v, 66 amplifier
35 vibration generator
37, 68 mixer
40 memory unit
50 device control unit
55 vibration unit
62, 562 vibration source
64 sound source
101 input-information acquisition unit
101p pressure detection unit
101v movement-speed detection unit
102 display processing unit
103 sound setting unit
104 sound processing unit
110, 510 vibration control unit 110*d* delay unit
110*g* gain setting unit
221 contact detection unit
222 device detection unit
What is claimed is:

1. An information processing system comprising:
an input device including a vibration generator that vibrates in accordance with a drive signal; and
a controller that:
  acquires input information indicating pressure acting on the input device and a moving state of the input device;
  controls vibration characteristics of a vibration source signal acquired from a vibration source based on the input information; and
  controls the vibration characteristics using a delayed speed that is obtained by delaying a speed indicating the moving state, wherein
  the drive signal includes a vibration signal that has vibration characteristics controlled by the controller.

2. The information processing system according to claim 1, wherein the controller further synthesizes a vibration signal, which is obtained by controlling the vibration characteristics of the vibration source signal, and a sound signal, thus generating a drive signal.

3. The information processing system according to claim 2, wherein
  the controller further controls acoustic characteristics of a sound source signal obtained from a sound source without delaying the speed, based on the input information, and
  the controller further synthesizes the vibration signal and a sound signal, which is obtained by controlling the acoustic characteristics of the sound source signal, thus generating the drive signal.

4. The information processing system according to claim 1, wherein vibration characteristics of the vibration signal include amplitude.

5. An information processing apparatus comprising:
a controller that:
  acquires input information indicating pressure acting on an input device and a moving state of the input device;
  controls vibration characteristics of a vibration source signal acquired from a vibration source based on the input information, thus generating a vibration signal;
  outputs a drive signal including the vibration signal to the input device; and
  controls the vibration characteristics using a delayed speed that is obtained by delaying a speed indicating the moving state.

6. A control method for an information processing system including an information processing apparatus and an input device, the input device including a vibration generator that vibrates based on a drive signal including a vibration signal, the method comprising:
  acquiring input information indicating pressure acting on the input device and a moving state of the input device;
  controlling vibration characteristics of a vibration source signal acquired from a vibration source based on the input information, thus generating a vibration signal; and
  controlling the vibration characteristics using a delayed speed that is obtained by delaying a speed indicating the moving state.

* * * * *